United States Patent Office 3,297,939
Patented Jan. 10, 1967

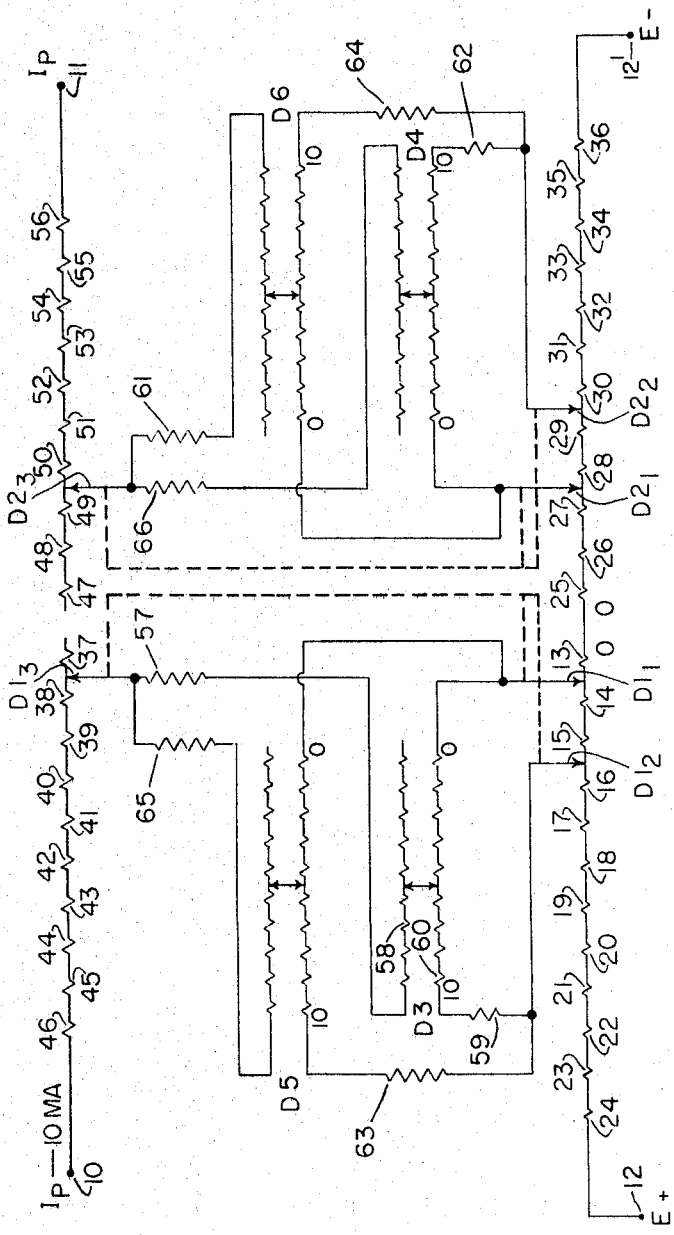

---

3,297,939
DIRECT READING POTENTIOMETER
Thomas M. Dauphinee, Ottawa, Ontario, Canada, assignor to National Research Council, Ottawa, Ontario, Canada, a body corporate of Canada
Filed Jan. 13, 1964, Ser. No. 337,308
8 Claims. (Cl. 323—43.5)

The present invention relates to an improved potentiometer which is capable of six-figure accuracy and is particulraly suited for use with apparatus for determining temperatures such as electrical resistance thermometers or thermocouples and, in general, is useful for all high precision voltage measurements such as a calibration of other less accurate voltage measuring apparatus.

Numerous circuits have been developed for potentiometers which have attempted to improve the stability of the potentiometer, increase its accuracy, avoid errors introduced by thermal E.M.F.'s generated in switch contacts, and to provide convenient and accurate range changing by altering the working current. Known potentiometers such as the Diesselhorst and Wenner are well suited for range changing by changing the working current; but the zero potential point in the measuring circuit is unstable since this zero is obtained by the subtraction of two substantial voltages. The Rubicon Thermofree Potentiometer has a stable zero point. However, three working current sources are used in this potentiometer, one of which is a standard cell. Accordingly, range changing involves a considerable amount of switching and it is not practical to use voltage measuring ranges other than the two for which it is designed, and if such changes are attempted, as is frequently desirable for calibration purposes and for some types of measurement, the accuracy of the instrument is seriously affected.

The present invention provides a potentiometer which overcomes the defects of known potentiometers. This potentiometer has both a stable zero point and is well suited for range changing by alteration of the working current.

Switch contacts within the measuring circuit of known potentiometers generate thermal E.M.F.'s which tend to give false and variable readings in the use of high precision potentiometers. A further problem with many known potentiometers is that there is inherently a fairly high and variable value of resistance in the measuring loop and this resistance gives rise to changes of damping of the galvanometer and also to changes in the sensitivity of the galvanometer during final balancing of the measurement.

High accuracy potentiometers are normally used with thermostated standard cells, and in some cases thermostated resistance elements, and in air-conditioned laboratories with non-corrosive atmospheres. It is also normal practice in such instruments to enclose all switches and resistances to exclude dirt, etc. The resistors used in high precision potentiometers are normally formed of manganin wire wound on brass cores and silver-soldered to copper conductors. The techniques for the construction of high precision potentiometers are well known to the manufactures of such instruments. In order to assure the ultimate accuracy of which the potentiometer of the present invention is capable, normal high precision structural practices would be used.

The present invention provides a direct reading potentiometer which contains no contacts in the measuring loop and which also has a relatively low resistance in the measuring loop. This resistance is fixed and is not changed to an appreciable extent during measurements.

The potentiometer of the present invention uses a single source of working current and therefore can be used as a four terminal resistor, and the working current can readily be changed to effect range changing of the potentiometer.

The potentiometer of the present invention relies on a constant current flowing through the potentiometer circuit which is accurately controlled to its required value by reference to a standard cell. In order to prevent changes in current, the potentiometer is so constructed that the resistance of the potentiometer, as seen by the external source of working current is constant, regardless of the setting of the dials. That is, the resistance of each of the dials to the working current is maintained constant regardless of the setting of the dials.

A further feature of the present invention is that none of the major dial switches need be constructed to an extremely low tolerance of switch resistance or of thermal E.M.F.'s since resistances or E.M.F.'s such as are found in normal well constructed switches have negligible effect on the potentiometer voltage.

One form of a potentiometer in accordance with the present invention is constructed effectively in two portions with the first and second dials operating in series and with the third and fifth dials shunted across a portion of the first dial, and the fourth and six dials shunted across a portion of the second dial. In one embodiment constructed in accordance with the invention, the third and fifth dials are shunted across two dial divisions of the first dial, and the fourth and sixth are shunted across two dial divisions of the second dial. The advantage of this is that only the first and second dial switch resistances will have any effect on the overall measurment with the potentiometer and any thermal E.M.F.'s generated by these switches will be attenuated by the resistances of the third and fifth dials and fourth and sixth dials. Further, the switch resistance tolerance requirements on the the third to sixth dials are so broad that no problem would be encountered in the construction of such a potentiometer. Thus, the only two critical switch contacts in the potentiometer from the point of view of switch resistance are associated with the first and second dial, and with a particular form of the instrument to be subsequently described, the switch resistance tolerance of the first dial is $0.01\Omega$ and the second dial is $0.1\Omega$. Switches are currently available which have resistance tolerances of $0.001\Omega$, which are quite stable even though operated for long periods of time.

The first dial of a potentiometer constructed in accordance with this invention consists of two identical tapped resistors, one of which has two switch contacts which are spaced apart at least one tap on one of the resistors and a third switch contact on the other tapped resistor which is operated together with the other two contacts, so that as resistance is added by the double contact portion of the dial, resistance is simultaneously subtracted by the third contact of the dial. Thus, the total resistance between working current terminals presented by the first dial is maintained constant regardless of the position of the switch contacts. Similarly, the second dial is provided with three contacts and is similarly constructed so that the total resistance of the second dial to the working current is maintained constant. The first and second dials are connected in series with the working current, and the third to sixth dials are shunted across the first two contacts of each of the first and second dials are connected in series with the working current, and the third to sixth dials are shunted across the first two contacts of each of the first and second dials and in series with the third voltage subdivisions required for the finer dials. If the working current is 10 milliamperes and the first dial is constructed with 1Ω resistance between taps, then each step on the first dial will represent .01 volt. If the second dial is constructed with .1Ω resistance between taps, then each step on the second dial will be 1/10 of one step on the first dial or .001 volt. Accordingly, each step on the sixth dial, assuming that each dial is a further subdivision by 10 of a step on the preceding dial, will be 0.1 μv. It will thus be appreciated that the present invention provides a highly accurate and stable direct reading potentiometer, which is neutral in the sense that there are no switches, and only a fixed value of low resistance in series with the galvanometer and the unknown potential. In one embodiment of the invention, this potentiometer is capable of accurate readings to 0.1 μv. with 10 ma. working current. With 1 ma. working current the least step is 0.01 μv.

The present invention provides a novel dial structure for a potentiometer comprising two tapped resistance elements having equal resistance values between the taps of the two elements and provided with three contacts. One contact is adapted to make connection with the taps on the first of the resistance elements, a second contact is similarly adapted to make connection with the taps on the first resistance elements but is arranged to make connection to a tap which is a predetermined and constant number of taps displaced from the tap to which the first contact is connected. The third contact is adapted to connect with the taps on the second resistance element. All three contacts are mechanically interconnected for simultaneous motion. The first and second resistance elements and the contacts are electrically interconnected so that the electrical resistance between one end of the first resistance element and the other end of the second resistance element is maintained constant regardless of the position of the three contacts. The second contact on the first resistance element is provided so that current may be divided between the first and second contacts by means of a suitable constant resistance current dividing network to permit a finer subdivision of the potentiometer voltage than is obtainable by the resistances of the first resistance element. The end terminals of the first resistance element are connected in the measuring circuit of the potentiometer so that variation of the position of the contacts on the dial causes variation in the voltage appearing in the measuring circuit.

A potentiometer constructed in accordance with the present invention may include one of the dials just described and in a preferred form of the invention will include two such dials connected in series, with the first resistance element of each dial being connected in the measuring circuit. The resistance of the resistance elements may conveniently be arranged so that each step of the second dial is one-tenth of one step of the first dial.

A further feature of a potentiometer constructed in accordance with the invention is that the potential developed by the potentiometer is derived solely from a single source of working current and accordingly the range of measurements obtainable with the potentiometer may be varied by simple changes of the working current. For example, in one form of the invention the normal working current is 10 milliamperes and the smallest division of the smallest dial of the potentiometer is 0.1 μv. The same potentiometer may be altered to provide a least step of .01 μv. by changing the working current from 10 milliamperes to 1 milliampere. Circuits are well known to those skilled in the art which may be used for changing the working current of a potentiometer without loss in accuracy.

The drawing of this application schematically illustrates the structure of a potentiometer constructed in accordance with the present invention. Although this drawing is in schematic form, it is believed sufficiently to illustrate the principles and practice of the present invention and would enable a potentiometer manufacturer using the normal techniques of construction for high precision potentiometers to construct satisfactory potentiometers.

As illustrated in the drawing, a primary or working current $I_p$ flows in the potentiometer between the terminal 10 and the terminal 11. This current is accurately controlled by reference to a standard cell (not shown) to a value of 10 milliamperes. The unknown potential and the balancing galvanometer are connected to the terminals 12 and $12^1$. If the contacts $D1_1$ and $D2_1$ are set to the zero position adjacent to the series connected end portions of resistances 13 and 25, and similarly the dials, or tapped resistor structures, D3, D4, D5 and D6 are set to their zero positions, then there will be no current flowing through the resistance 13 to 36 due to the working or primary current $I_p$ and the potential across the terminals 12 and $12^1$ with no external connections to these terminals will be zero. Similarly, if the contact $D1_1$ is connected between resistances 13 and 14, then the voltage drop between the terminals 12 and $12^1$ will be .01 volt. Since the resistances 13 to 24 all have a resistance of 1Ω, as the contact $D1_1$ is moved to the left along the resistances 13 to 24 each step represents .01 volt. Since the dial D2 is identical in construction with the dial D1, except for the value of the resistances which are 0.1Ω instead of 1Ω, each step along the D2 dial represents .001 volt.

Contact $D1_3$ is synchronized for motion with contacts $D1_1$, $D1_2$, and since resistances 37 to 46 are 1Ω resistors, when contact $D1_1$ adds resistance to the working current circuit, contact $D1_3$ subtracts equal amounts of resistance and thus the total resistance of a potentiometer, as seen by the working current, remains constant and the current will not vary. Similarly, contact $D2_3$ removes the same amount of resistance from the working current circuit as is added by contact $D2_1$ and again the resistance, as seen by working current, remains constant and there is no variation of the working current due to changes of the first or second dials.

As illustrated in the drawing, the dials D3 and D5 are shunted across contacts $D1_1$ and $D1_2$. Each of the resistors of dial D3 has a value of approximately 10Ω as do each of the resistors of the dials D4, D5 and D6. The dials D3 to D6 inclusive are designed to provide a constant resistance to the working current so that the working current will not be affected by changes of dial settings and the ratio of currents in the D3 and D5 contacts and the D4 and D6 contacts will stay constant. This is achieved by having equal increments of resistance tapped by each step of dials D3 to D6, as is required, at constant dial current, to give equal increments of current at the outer dial 1 or dial 2 contact $D1_2$ and $D2_2$ and at the same time changing the resistance in series with the tapped contact to maintain the overall resistance of the dial constant. Thus when the tap is at the right hand end of dial D3, all the working current flowing in resistor 57 is passed to contact $D1_1$. When the contact of D3 is moved 1 tap to the left, approximately 1/200 of the current (in the absence of dial D5, exactly 1/200 of the total potentiometer current) is diverted to contact $D1_2$. For each additional step of dial D3 a further 1/200 of the current is diverted to $D1_2$. The additional voltage drop generated by each increment of current across the two dial 1 resistors which are bridged by contacts $D1_1$ and $D1_2$ is then 1/100 of the voltage increment for one step of dial 1. The resistance of the D3 network to the working current remains constant and the same current continues to flow through the resistor 57 regardless of the setting of dial D3. Similarly, each of the dials D4 to D6 presents a constant resistance to the flow of working current regardless of the setting of these dials. The construction of similar constant resistance current tapping devices is shown in U.S. Patent 2,083,408 granted June 8, 1937, to I. M. Stein. Since these dials are all of similar construction, they may be readily fabricated and hence the amount of complication in manufacturing the instrument is reduced. The resistor 57 is connected in series with the contact $D1_3$ and to the resistance 58 of the constant resistance dial D3. Additionally, the resistor 59 is connected in series with the contact $D1_2$ and the resistor 60 of the constant resistance dial D3. Thus, the dial D3, which consists of 10Ω resistors in series with the approximately 2000Ω resistor 59 is across the 2Ω resistance between contacts $D1_1$ and $D1_2$ and divides the working current between $D1_1$ and $D1_2$ to provide a maximum potential above the potential indicated by the position of contact $D1_1$ of 0.1 of a single step of the D1 dial. Similarly, dials D4 to D6 are connected in series with appropriate resistors so that each step of a dial represents 1/10 of the step of the preceding dial.

As may be seen, dials D3 and D5 are connected across two steps of dial D1, and dials D4 and D6 are connected across two steps of dial D2. Each step of dial D3 measures 0.01 of a step of dial D1 and each step of dial D5 measures 0.0001 of a step of dial D1, each step of dial D4 measures 0.01 of a step of dial D2, and each step of dial D6 measures 0.0001 of a single step of dial D2.

In use, the primary or working current $I_p$ is standardized to a value of 10 milliamperes and maintained at this value by making the voltage drop across a known reference resistor (not shown) which is in series with the whole measuring current equal to the voltage of the standard cell. An unknown potential and measuring galvanometer are connected across the terminals 12 and $12^1$. The dials of the potentiometer are adjusted until there is no deflection of the measuring galvanometer, at which point the potential, as shown by the dials $D_1$ to $D_6$ of the potentiometer, is the potential of the unknown source.

In the preferred form of the invention just described the third and fifth dials are connected across the first dial and the fourth and sixth dials are connected across the second dial. With the circuit of the present invention it would not be desirable to connect the third and fourth dials across the first dial because these dials would interact and cause errors. The third and fifth dials and fourth and sixth dials do interact with one another but the error produced by this interaction is sufficiently small that the accuracy of the instrument is not affected. It is within the scope of the present invention to add a seventh dial to the potentiometer provided that account is taken of the interaction of the third and fifth dials so that a correction may be applied to the readings of the seventh dial to account for the inaccuracy. The correction to the seventh dial may be readily computed by anyone skilled in the art.

I claim:

1. A potentiometer comprising in combination: first, second and third terminals; first and second tapped resistors each having the same resistance value between taps as the other, said second tapped resistor being connected at one end with said first terminal thence to be connected with a source of working current, the other end of said second tapped resistor having no electrical connection, and said first tapped resistor interconnecting said second and third terminals to have said terminals for connection in circuit with a source of potential to be measured, and said first tapped resistor having an end portion to be connected with the source of working current for placing said first tapped resistor in an electrically connected relation to the source of working current; first and second contacts for contacting a selected pair of taps of said first tapped resistor and said first and second contacts being spaced apart a predetermined number of taps of said first tapped resistor; a third contact for contacting a selected tap of said second tapped resistor; and a constant resistance voltage divider connected across said first and second contacts and connected to said third contact to cause the working current flowing in said third contact to be shared between said first and second contacts, and for retaining a constant resistance to said working current; said first, second and third contacts being mechanically ganged to maintain a substantially constant resistance between said first terminal of the potentiometer and said end portion of said first tapped resistor.

2. A potentiometer according to claim 1, wherein the number of taps on said first tapped resistor is at least 10 plus said predetermined number of taps by which said first and second contacts are spaced apart, and the number of taps on said second resistor equals the number of taps on said first resistor minus said predetermined number.

3. A potentiometer according to claim 1, wherein said constant resistance voltage divider comprises a tapped resistor structure, each step on said tapped resistor structure being a fraction of a step of said first and second tapped resistors to provide a finer subdivision of the voltage indicated by the position of said contacts on said first and second tapped resistors.

4. A potentiometer as claimed in claim 3, wherein said constant resistance voltage divider comprises a plurality of tapped resistor structures each providing a finer subdivision of the voltage indicated by the position of said contacts on said first and second tapped resistors.

5. A potentiometer as claimed in claim 1, wherein the resistance between each tap of said first and second tapped resistors is one ohm.

6. A potentiometer comprising in combination: first, second, third and fourth terminals; first and second tapped resistors each having the same resistance value between taps as the other; third and fourth tapped resistors each having the same resistance value between taps as the other; said second and fourth tapped resistors having ends connected with said first and fourth terminals thence to be connected with a source of working current, the other ends of said second and fourth tapped resistors having no electrical connection; and said first and third tapped resistors interconnecting said second and third terminals in series to have said second and third terminals for connection in circuit with a source of potential to be measured; first and second contacts for contacting a selected pair of taps of said first tapped resistor and said first and second contacts being spaced apart a predetermined number of taps of said first tapped resistor; a third contact for contacting a selected tap of said second tapped resistor; fourth and fifth contacts for contacting a selected pair of taps of said third tapped resistor and said fourth and fifth contacts being spaced apart a predetermined number of taps of said third tapped resistor; a sixth contact for contacting a selected tap of said fourth tapped resistor; and first and second constant resistance voltage dividers for retaining a constant resistance to said working current, said first constant resistance voltage divider connected across said first and second contacts and to said third contact to cause the working current flowing in said third contact to be shared between said first and second contacts, and said second voltage divider connected across said fourth and fifth contacts and to said sixth contact to cause the working current flowing in said sixth contact to be shared between said fourth and fifth contacts; said first, second and third contacts being mechanically ganged and said fourth, fifth and sixth contacts being mechanically ganged, to maintain a substantially constant resistance between said first and fourth terminals.

7. A potentiometer according to claim 6, wherein the number of taps on said first tapped resistor is at least 10 plus said predetermined number of taps by which said first and second contacts are spaced apart, the number of taps on said second resistor equals the number of taps on said first resistor minus said predetermined number, the number of taps on said third tapped resistor is at least 10 plus said predetermined number of taps by which said fourth and fifth contacts are spaced apart, and the number of taps on said fourth tapped resistor equals the number of taps on said third tapped resistor, minus said last mentioned predetermined number.

8. A potentiomter according to claim 6, wherein said first constant resistance voltage divider comprises a first tapped resistor structure, each step on said first tapped resistor structure being a fraction of a step of said first and second tapped resistors, and said second constant resistance voltage divider comprises a second tapped resistor structure, each step on said second tapped resistor structure being a fraction of a step of said third and fourth tapped resistors.

References Cited by the Examiner

UNITED STATES PATENTS 2,884,505   4/1959   Strain et al. _____ 323—74 X
3,065,418   11/1962   Dauphinee _____ 323—79 X

OTHER REFERENCES

Clothier: "A switch Dial Potential Divider," Journal of Scientific Instruments, vol. 33, May 1956, pp. 196–198.

Schaffer: "The Six-Dial Thermofree Potentiometer," Instruments and Control Systems, vol. 34, February 1961, pp. 283–291.

JOHN F. COUCH, *Primary Examiner.*

A. D. PELLINEN, *Assistant Examiner.*